United States Patent
Robson et al.

(10) Patent No.: US 8,140,463 B2
(45) Date of Patent: Mar. 20, 2012

(54) AUTOMATED METADATA GENERATION OF LEARNING AND KNOWLEDGE OBJECTS

(75) Inventors: Robert O. Robson, Corvallis, OR (US); Martin Hald, West Linn, OR (US)

(73) Assignee: Eduworks Corporation, Corvallis, OR (US)

( * ) Notice: Subject to any disclaimer, the term of this patent is extended or adjusted under 35 U.S.C. 154(b) by 757 days.

(21) Appl. No.: 12/253,998

(22) Filed: Oct. 19, 2008

(65) Prior Publication Data

US 2010/0106672 A1 Apr. 29, 2010

(51) Int. Cl.
*G06F 17/00* (2006.01)
*G06N 5/02* (2006.01)

(52) U.S. Cl. .......................................... 706/50
(58) Field of Classification Search ....... 706/50
See application file for complete search history.

(56) References Cited

U.S. PATENT DOCUMENTS

2008/0162498 A1* 7/2008 Omoigui ................. 707/10
2008/0168135 A1* 7/2008 Redlich et al. ............ 709/204

OTHER PUBLICATIONS

The Communication Middleware for Collaborative Learning Object Repository Network by Ty Mey Eap Thesis Submitted in Partial Fullfilment of the Requirements for the Degree of Master of Science.*

* cited by examiner

*Primary Examiner* — Omar Fernandez Rivas
*Assistant Examiner* — Ababacar Seck
(74) *Attorney, Agent, or Firm* — Maxvalueip LLC (57) ABSTRACT

A novel system for automated metadata generation of learning and knowledge Objects are presented. Such system automates the processes of adding descriptive and contextual information to digital learning content, digital documents, and other objects used in learning and knowledge management. It also automates the process of creating associations among higher level objects and classifications systems used to organize content, and it does so in a way that improves the functionality of existing technologies, that can be tuned to meet the needs of a particular organization or community of practice, and that can be extended and refined to take advantage of new information retrieval technologies. It includes methods that handle aggregate digital objects composed of a plurality of other objects and that improves efficiency by caching data and recognizing the relationships among aggregate objects and their components.

20 Claims, 4 Drawing Sheets

AUTOMATED METADATA GENERATION OF LEARNING AND KNOWLEDGE OBJECTS

BACKGROUND OF THE INVENTION

There are numerous systems and methods that extract information from digital files. These are called information retrieval routines. Most of these provide a single piece of information, and it is necessary to aggregate and process this information to automatically generate metadata that is often contextual or subjective in nature. There are many approaches to doing this, including semantic analysis, searching for key words or terms, and searching for standardized associated licenses. An effective method must apply multiple such approaches.

There is a need to generate metadata in a way that enables the metadata to be used by other applications such as authoring tools, learning content management systems and rights management systems. It is also required to support continual improvement of the results by making it possible to substitute new or improved information retrieval routines for existing ones and by making it possible to combine the output of these routines in new ways.

Another challenge of metadata generation is the fact that digital objects often are comprised of multiple smaller objects. For example, a Web page might contain text, images, a movie and an interactive quiz written in a format such as Adobe Flash. It is advantageous to generate, retain and aggregate information on smaller objects that comprise a larger object. This leads to a significant performance advantage over prior art.

Current systems cannot estimate complex quantities such as typical learning time, effectively search for rights licenses or be used to determine whether a learning object or knowledge object is in line with a particular design paradigm or cognitive theory. In addition, current systems suffer from three other drawbacks:

1. They are not designed to integrate directly into end user applications.
2. They are not architected to take advantage of multiple methods.
3. They are not designed to deal with aggregate objects.

SUMMARY OF THE INVENTION

The present invention automates the processes of adding descriptive and contextual information to digital learning content, digital documents, and other objects used in learning and knowledge management. It also automates the process of creating associations among higher level objects and classifications systems used to organize content. The present invention does so in a way that improves the functionality of existing technologies, that can be tuned to meet the needs of a particular organization or community of practice, and that can be extended and refined to take advantage of new information retrieval technologies. The present invention includes methods that handle aggregate digital objects composed of a plurality of other objects and that improve efficiency by caching data and recognizing the relationships among aggregate objects and their components.

The disclosed invention consists of an analysis engine, service layer, a configuration module and a host application. The objects being analyzed are typically stored in a data store.

DETAILED DESCRIPTION OF THE PREFERRED EMBODIMENTS

There are numerous systems and methods that extract information from digital files. These are called information retrieval routines. Most of these provide a single piece of information, and it is necessary to aggregate and process this information to automatically generate metadata that is often contextual or subjective in nature.

As an example, an instructional designer is often tasked with developing learning content that is designed to last a certain amount of time (e.g. 15 minutes). To determine the "typical learning time" of a piece of learning content by machine, one has to aggregate data on the length of text, duration of media files, complexity of the subject matter, number and nature of quizzes contained in the content, and so on. As another example, it is often important to identify the terms of use under which a document is licensed. There are many approaches to doing this, including semantic analysis, searching for key words or terms, and searching for standardized associated licenses. An effective method must apply multiple such approaches. As a third example, some learning theories emphasize that content should be broken into "chunks" that have a single learning objective. To determine whether or not this is the case, it is necessary to first understand the navigational structure of the content (e.g., using link analysis and other graph-theoretic techniques), to match each unit within the content to a set of learning objectives (e.g., using latent semantic analysis) and to determine the extent to which the content can be decomposed into semantically homogenous components (e.g., by applying numerical techniques to the output of vector-based semantic analysis algorithms.) Determinations of this nature mix information retrieved from radically different methods (e.g. semantic analysis, link analysis, and possibly a human choosing a subset of a course or knowledge object to examine).

The present invention generates metadata of the type described above and does so in a way that enables the metadata to be used by other applications such as authoring tools, learning content management systems and rights management systems. It also is enables continual improvement of the results by making it possible to substitute new or improved information retrieval routines for existing ones used by the invention, and by making it possibly to combined the output of these routines in new ways.

Another challenge of metadata generation is presented by the fact that digital objects often are comprised of multiple smaller objects. For example, a Web page might contain text, images, a movie and an interactive quiz written in a format such as Adobe Flash. The present invention generates, retains and aggregates information on smaller objects that comprise a larger object. This leads to a significant performance advantage over prior art.

ADVANTAGES OF THE INVENTION COMPARED TO PRIOR ART

Current systems cannot estimate complex quantities such as typical learning time, effectively search for rights licenses or be used to determine whether a learning object or knowledge object is in line with a particular design paradigm or cognitive theory. In addition, current systems suffer from three other drawbacks.

1. They are not designed to integrate directly into end user applications. Such integration has many uses—for example, a designer could see the learning time change as content is added to a course, or putative rights licenses could be displayed when content is stored or retrieved from a repository.

2. They are not architected to take advantage of new methods. For example, if one component that goes into computing the typical learning time is a measure of the reading level of text, it is advantageous to be able to try several different methods for estimating this level.

3. They are not designed to deal with aggregate objects. Digital media are typically composed of many sub-objects, often at several levels of granularity (e.g. Course, module, information object, asset). It is a significant improvement on current methods to recognize the aggregation structure of an object and to generate metadata at every level of aggregation.

Some of the Features in this Embodiment

The present invention automates the processes of adding descriptive and contextual information to digital learning content, digital documents, and other objects used in learning and knowledge management. It also automates the process of creating associations among higher level objects such as "documents," "assessments," "knowledge objects", "rights licenses," "learning objects," "competencies" and "learning interventions" and classifications systems used to organize content. The present invention does so in a way that improves the functionality of existing technologies, that can be tuned to meet the needs of a particular organization or community of practice, and that can be extended and refined to take advantage of new information retrieval technologies. The present invention includes methods that handle aggregate digital objects composed of a plurality of other objects and that improve efficiency by caching data and recognizing the relationships among aggregate objects and their components.

The disclosed invention consists of an analysis engine, service layer, a configuration module and a host application. The objects being analyzed are typically stored in a data store which is a file system, database, repository or part of the host application. See FIG. 1.

Figure 1:
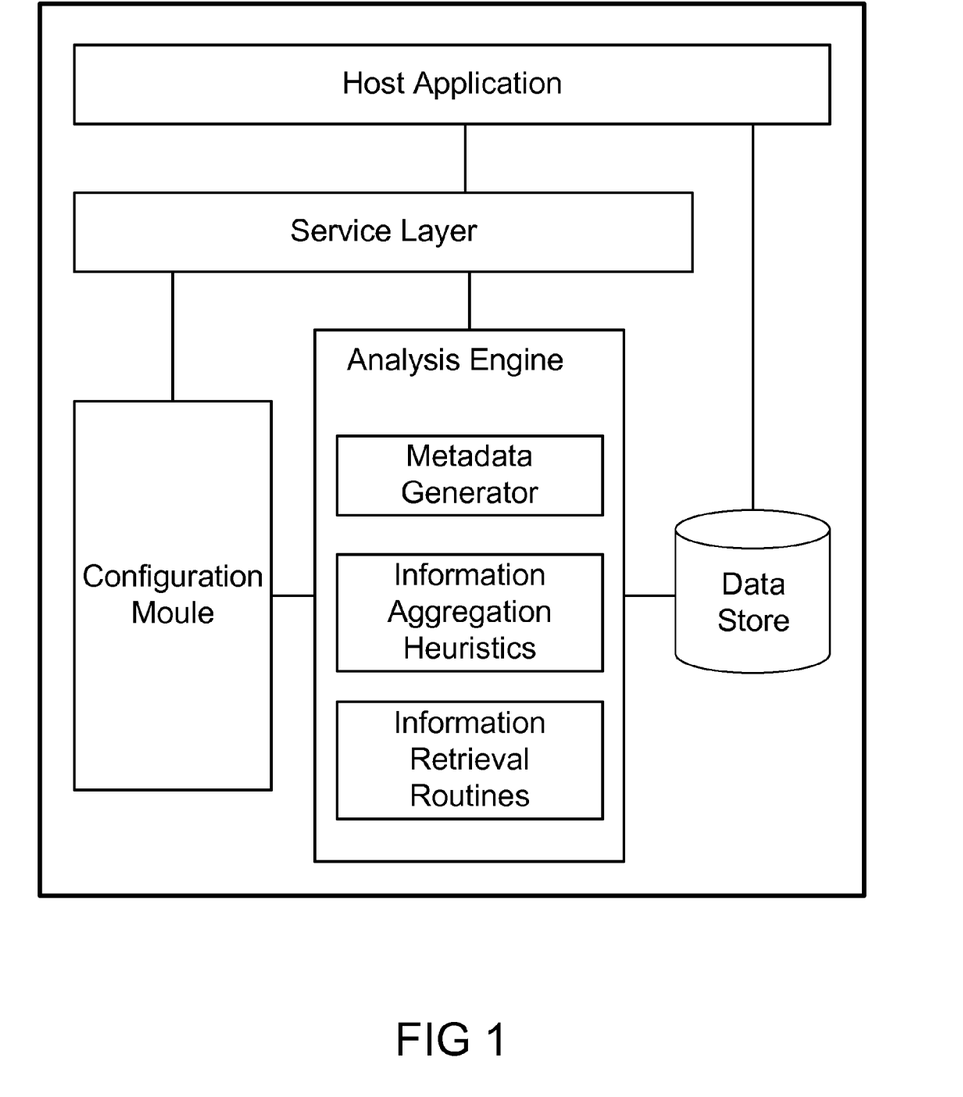
FIG. 1 is a schematic diagram of the invented system for automated metadata generation of learning and knowledge objects.

The host application is a software application such as a Web content authoring tool, learning content management system, document authoring tool, content management system, or knowledge management tool. It is configured to identify an object to be analyzed to submit requests to the analysis engine through a service layer. Requests are typically triggered by user actions such as importing or publishing content.

When triggered, the analysis engine applies a plurality of information retrieval routines to determine a plurality of descriptive, contextual and classification information about digital objects and their sub-objects. The analysis engine is constructed so that information retrieval routines can be added, deleted, and swapped in and out as is appropriate for a particular application. The information retrieved is then processed using a set of configurable information aggregation heuristics. The output of this step is called metadata. It can be as specific as elements in a fixed metadata schema and as general as rights licenses or correspondences between various types of objects based on semantic matches. In preferred embodiments, all metadata is represented using de jure or de facto standards. This metadata is then passed back to the host application via the integration service and is used by the host application in a plurality of ways.

Parameters defining or controlling the behavior of the metadata, integration points, information retrieval routines, and information aggregation heuristics are stored in a configuration module.

DEFINITIONS, TERMS, ELEMENTS

The definitions below are for the purpose of providing examples, and, by no means are limiting. Any variations of the elements/definitions below are also meant to be covered by this application:

Object: In this disclosure object means a digital file or content aggregation that is to be used or analyzed by a host application or analysis engine.

Content Aggregation: A content aggregation is a collection of objects that for the purpose of an application can be treated as a single object. A typical example is a Web page that contains many embedded objects (text, graphics, video clips) but is treated as a single unit. Another example is a Sharable Content Object Reference Model (SCORM) content aggregation. Content aggregations may include metadata about itself or about objects it contains and may include further information, such as sequencing information, and rights information that, for the purposes of this disclosure is also considered to be metadata.

Metadata: Information about an object or associated with an object that is intended to make the object more useful in at least one context. The term is used as one skilled in the art would understand it to be used and is extended to include information such as intellectual property rights, mappings to other objects, classification according to arbitrary taxonomies, and representations of such information.

Information Retrieval Routine: A software component, library or assembly that examines objects and reports information about the content, structure, syntax, semantics, rights, or semantics of an object.

Content Aggregation Standard: A de facto or de jure standard such as MPEG-21 Part II, IMS Content Packaging, Darwin Information Typing Architecture, or Metadata Encoding and Transmission Standard that defines a way to identify a collection of digital objects as comprising a single object and provides a means to attach metadata to digital objects. Typically, such standards use XML but this is not a requirement.

Service Layer: A software service that provides application programmer interfaces (API'S) or Web services (typically described using Web Service Description Language [WSDL] and accessed through HTTP using the Simple Object Access Protocol [SOAP]) that enables a host application to request, respond to requests, and exchange data with other components of the invention.

Host Application: A software application that makes use of the invention or that invokes the functionality of the invention. Examples include authoring tools, Learning Content Management Systems, learning object or knowledge object repositories, software that manages content development workflows, and email applications.

Configuration Module: A component of the invention that stores configuration parameters and enables user access to those parameters through API'S or Web services.

Analysis Engine: A component of the invention that analyzes objects and generates metadata.

Information Aggregation Heuristic: A system or method for processing data provided by a plurality of information retrieval algorithms and producing metadata. An Information Aggregation heuristic may perform a task as simple as reformatting the output of a single information retrieval algorithm or as complex as making subject judgments about the nature of content based on multiple outputs, configuration parameters, and environmental factors. For example, an Information Aggregation heuristic might use the output of an N-Gram implementation to populate a "language" element in a metadata schema, might use the outputs of multiple information retrieval algorithms to estimate the typical learning time of a learning object, or might compare existing metadata from multiple assets in a single object to try to determine whether the asset level metadata was cut and pasted by a previous author and should be replaced by automatically generated metadata.

Contextual Information: Contextual information is information that is external to an object being analyzed and to the analysis engine but that can be used by the analysis engine to generate metadata or improve the quality of metadata generated. Examples of contextual information include information such as name and role of a user of a host application on whose behalf the host application is invoking the analysis engine, information about objects being analyzed such as the fact that they are part of a series of learning objects on 6th grade mathematics or that they contain classified information generated for military applications.

FUNCTIONAL DESCRIPTION OF THE INVENTION

The present invention is intended to be integrated into a host application with which a user interacts or that is a component of an enterprise learning management, knowledge management or content management system. In one embodiment, the host application is a software application that is used to edit and publish digital content. In another embodiment the host application is a learning content management system or enterprise knowledge management system. In this embodiment, the present invention may integrate directly with the host application or with a database or repository accessed by the host application.

The host application interacts with the present invention through a service layer. The service layer communicates with the host application through Web Services or an Application Programming Interface (API). Each embodiment of the present invention may use one or more of these methods. In a preferred embodiment, communication takes place using Web Services that are described by Web Services Definition Language (WSDL) and that use the Simple Object Access Protocol (SOAP) to encode requests, report errors, and exchange metadata encoded using de jure or de facto standards. The service layer communicates with the analysis engine through a fixed set of APIs or services. This method enables changes to be made in the inner workings of the analysis engine without affecting the integration between the present invention and the host application. The present invention also is a significant improvement that enables metadata generation services to both request and provide information to host applications so that the host applications can exhibit improved human-compute interaction through metadata-aware applications and automate processes that heretofore required users to input significant quantities of metadata.

For example, a prior art discloses a method for matching learning content to skills taxonomies. Other methods based on word matching, regular expressions, and Bayesian inference have been disclosed and implemented. However, these are typically implemented directly into the host application. When improvements are made in the underlying methods, or better methods are found, it may require significant work to update the host application, assuming the vendor has the knowledge to do so.

Figure 2:
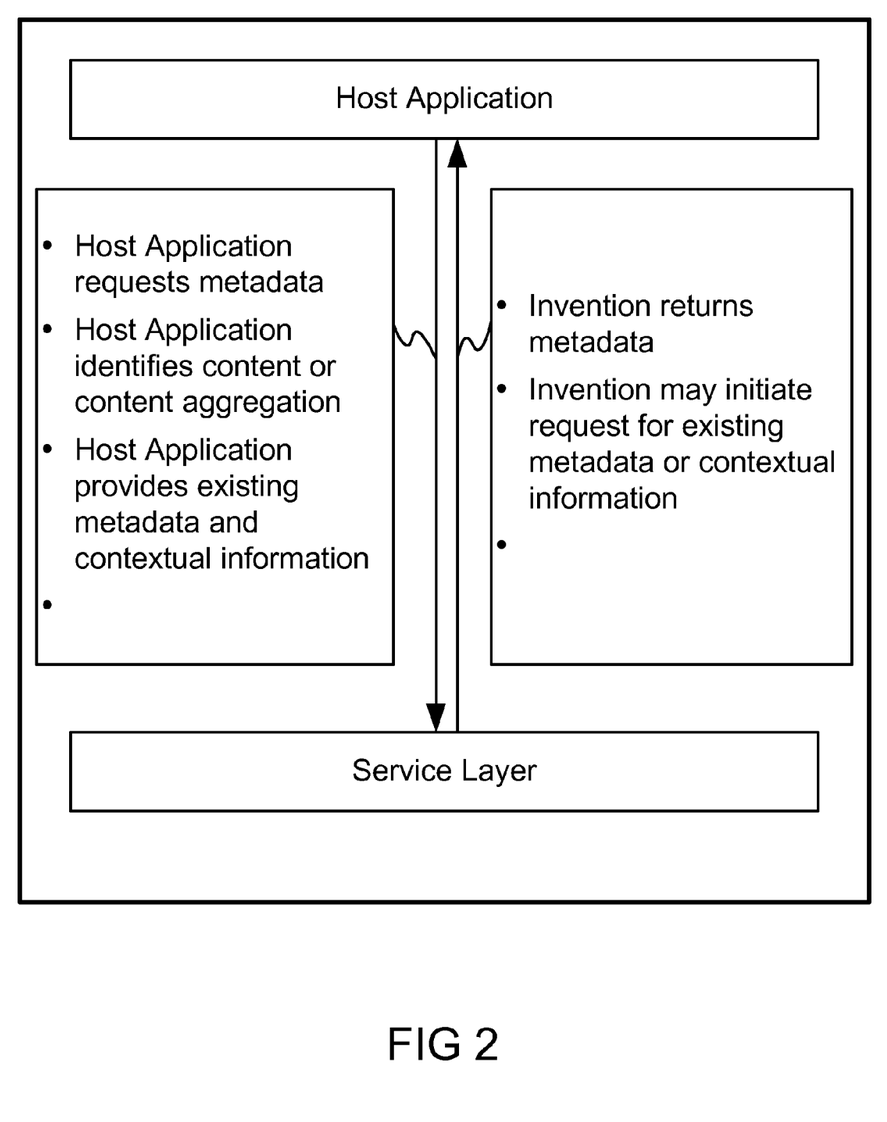
FIG. 2 is a schematic diagram showing the communication between Host application and Service layer.

When interacting with the present invention, the host application identifies or provides an object to the analysis engine, provides the analysis engine with existing metadata and with relevant contextual information known to the host application and requests specific metadata about the identified object (FIG. 2). In an embodiment where the host application is a learning content authoring tool and the present invention is configured to generate and encode metadata in conformance with the 1484.12.3-2005 IEEE Standard for Learning Technology—Extensible Markup Language (XML) Schema Definition Language Binding for Learning Object Metadata. Requests are made via the service layer. For example, the host application can request the "typical learning time" of content that is being authored. The ability to make such a request and receive an answer enables the host application to show the author the length of a course and to update the length as new content is added or existing content is edited. This improves the functionality of learning content authoring tools.

The integration service provides error checking and reporting. In a preferred embodiment the integration service will implement de jure and de facto standards (such as those provided by JSR170 or the Open Knowledge Initiative Service Interface Definitions) for integrating with host applications. Persons skilled in the art will recognize the value of applying standards and will know how to implement standards-based integration points.

Requests for metadata will include an identified content object or content aggregation. In a preferred embodiment, a content object is identified through a persistent unique identifier and content aggregations are identified using content aggregation standards.

Requests for metadata can be triggered in many ways. In one embodiment, they are triggered when a user attempts to fill out a metadata form. The metadata entered by the user is compared to the metadata returned by the integration service to the host application, providing a quality check that is an improvement for any system that requires users to complete metadata forms.

In another embodiment used by document storage providers, the workflow which previously was a machine-centric storage is reversed so as to be human-centric. In this embodiment the host application submits the document to the service layer and uses the resulting metadata to pre-fill the form for storage, or bypasses the form entirely integrating the metadata directly into the host applications data storage.

In another embodiment the host application is a content editing and publishing tool that creates standardized packages of content for use by other systems, e.g. that creates Sharable Content Object Reference Model (SCORM) content aggregations for use by a SCORM conformant learning management system. When the user selects "publish" in the host application, the host application requests metadata from the integration service. The type and format of the metadata requested is determined by the configuration module. The integration service requests the metadata from the analysis engine. The analysis engine checks to see if the requested metadata has already been generated and generates any missing metadata. The metadata is then returned by the analysis engine to the integration service and by the integration service to the host application. The host application then properly formats and inserts the metadata into the published package.

In another embodiment the designers of the host application wish to classify content handled by the host application according to one or more taxonomies. Typical taxonomies include taxonomies of corporate structure (departments), taxonomies of skills, knowledge, abilities and tasks, and designations of confidentiality, classification, or usage rights. One such taxonomy exists within the U.S. Department of Defense and designates, for example, whether foreign nationals may view a piece of learning content. Skills taxonomies such as that maintained by O*Net are prevalent.

There are several ways in which the host application can interact with the present invention in this embodiment. In one method, the user of the host application selects a classification from a drop down list. This triggers a request to automatically classify the content in question. The host application passes the selected classification to the present invention. The analysis engine returns its opinion of the correct classification together with a correlation between the selected classification and the suggested classification, based on semantic analysis techniques such as Latent Semantic Analysis that return values that may be interpreted as semantic correlates. In another method, the host application relies on the analysis engine to suggest a classification and either accepts that suggestion or enables the user to view and modify that suggestion. It will be apparent to one skilled in the art that numerous useful variations and applications of such interactions are enabled by the present invention.

Instead of a classification, the host application may wish to check for the existence of a statement of end user rights and provide one if none is present. The host application may also be designed to compare an existing statement of end user rights derived intrinsically from a document with an explicit statement associated with the document using a rights expression language such as the MPEG-21 Digital Rights Expression Language or via a link to a Creative Commons license. The host application may issue a request for any existing license and for a recommended license, determined by a list present in the configuration module.

In many embodiments, it is useful for the analysis engine to have information about the user of the host application or the work being performed using the host application. This is called contextual information. Typical contextual information includes the user's name, the user's role, the user's role in an organization, and the title of content in question. Other contextual information may be available from the configuration module, for example, the configuration module may specify that all content must be written in U.S. English. The present invention may request contextual information from the host application through an API or Web Service (FIG. 2). In a preferred embodiment, this contextual data is treated as metadata requested from the host application and is encoded using an appropriate standard.

The present invention may also use the service layer to request existing metadata from a host application (FIG. 2). In one embodiment it does so by using a Web service version of the Open Archives Initiative Metadata Harvesting Protocol. In another embodiment it does so by a SOAP request using the 1484.12.3-2005 IEEE Standard for Learning Technology—Extensible Markup Language (XML) Schema Definition Language Binding for Learning Object Metadata. In another embodiment the service layer requests an "empty" content aggregation, such as a SCORM conformant IMS manifest, that contains metadata for a content object and for its component objects. The present invention then unpacks the content aggregation and extracts the metadata.

Figure 3:
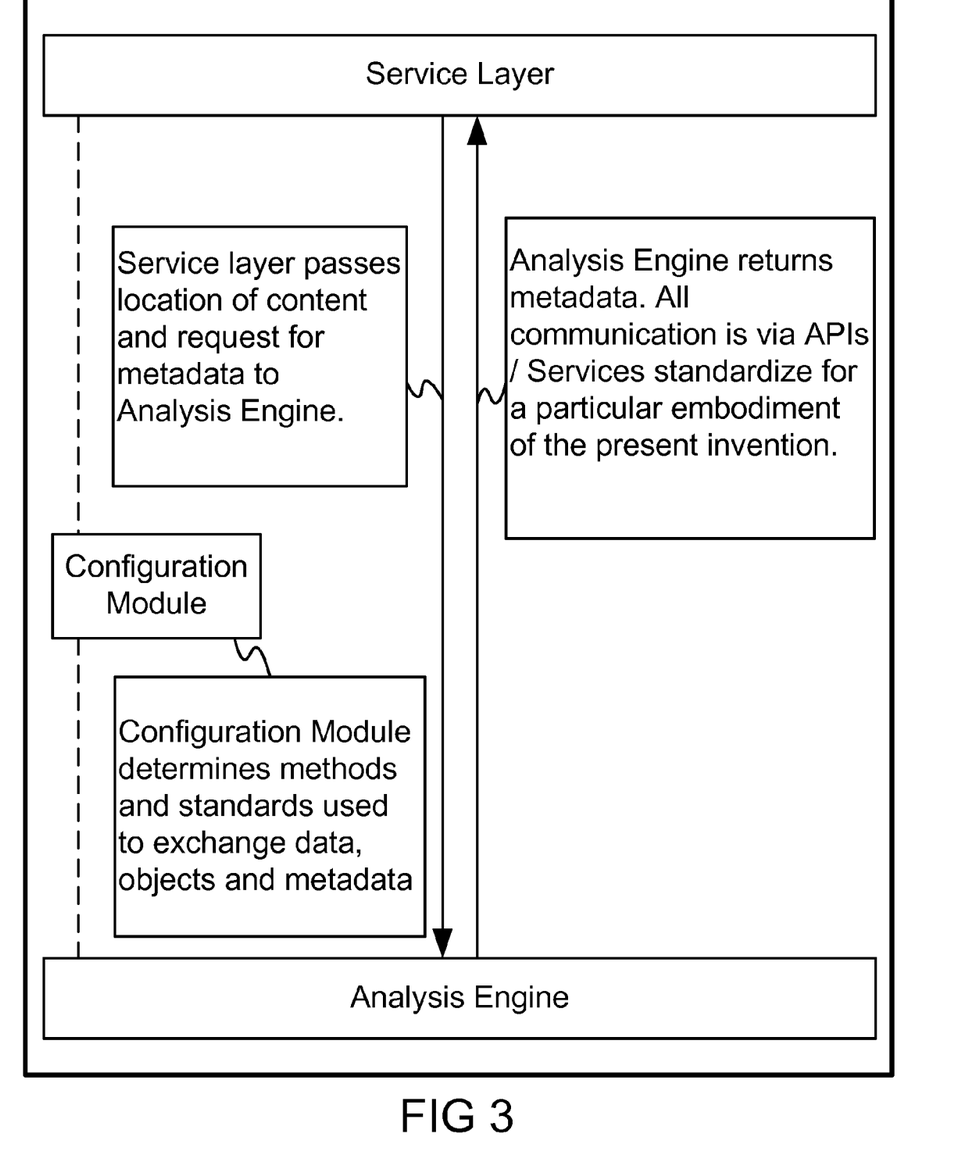
FIG. 3 is a schematic diagram showing the communication between Service layer and Analysis layer.

When a request is made to the service layer, the request is passed to the analysis engine. It will be apparent to one skilled in the art how to define Web Services or APIs that connect the service layer as an architectural component to the analysis engine (FIG. 3). In a preferred embodiment these components communicate via SOAP.

In a preferred embodiment, all requests to the analysis engine designate an object about which metadata will be generated (FIG. 3). In a preferred embodiment, all objects are considered content aggregations, with a single file being a special case, and all objects are represented using a content aggregation standard. In a preferred embodiment, the content aggregation standard used includes a persistent unique identifier that enables the analysis engine to retrieve the content objects and sub-objects from a Data Store that might be a Web Server, a Content Server, a Learning Content Management System, a Repository or other store. In one embodiment the identifier given is a handle that must first be resolved by a resolution service. The resolution service may either return the location of the object or be configured to retrieve the object itself.

In another embodiment, objects are described to the analysis engine through Uniform Resource Identifiers (URI). Each URI can be used to retrieve the object from a data store.

Figure 4:
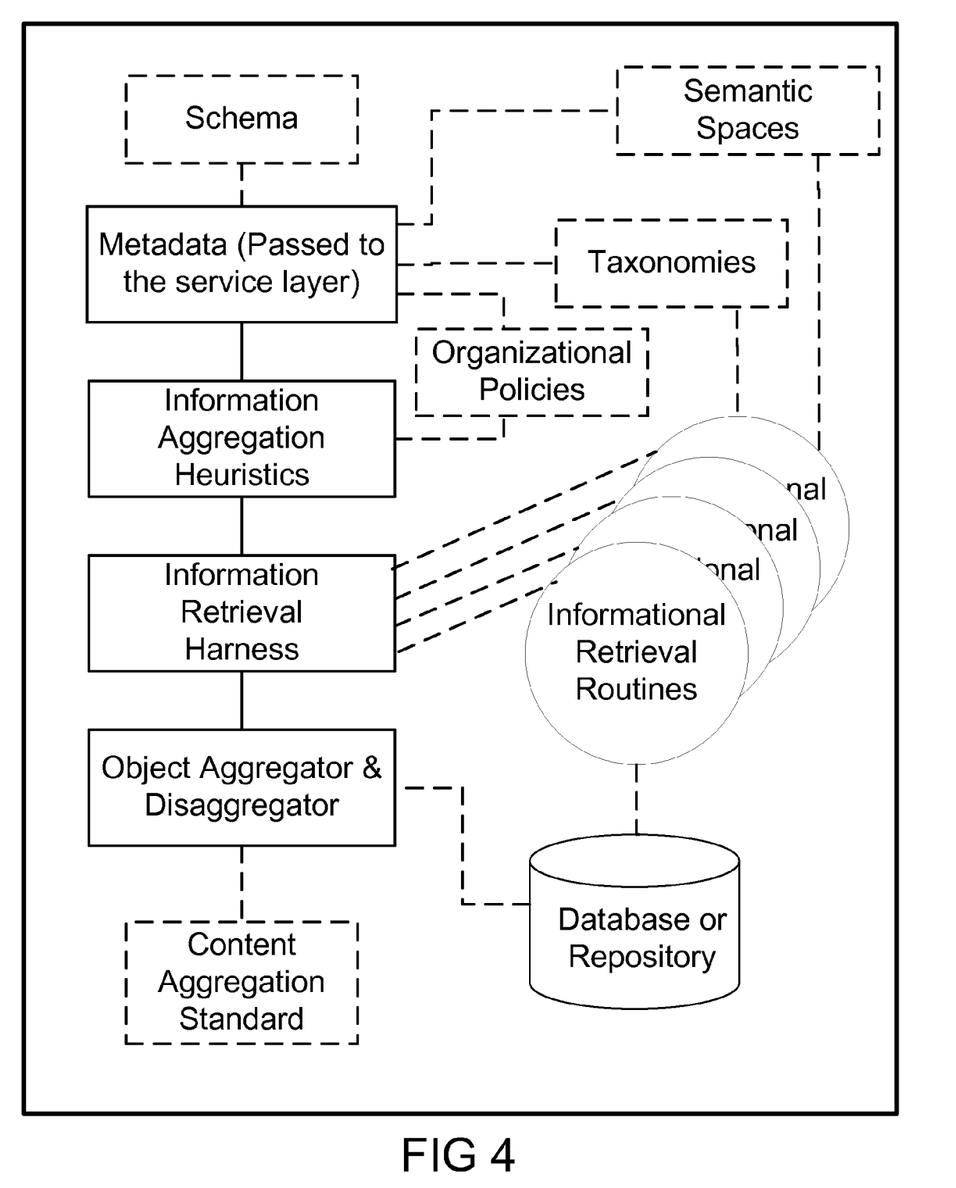
FIG. 4 is a schematic diagram showing the detailed functional blocks of the Analysis layer.

The analysis engine shown in FIG. 4 operates as following:

Step 1: An object is identified. If the object is a content aggregation, the analysis engine disaggregates the object, stores any existing metadata contained in the content aggregation (labeling it as such), and checks to see if it has already analyzed any component objects.

Step 2: Requested metadata is identified. In a preferred embodiment, requests must correspond to metadata schema stored in (or referenced by) the configuration module or natively stored in an embodiment of the invention. In a preferred embodiment for use with learning technology, the analysis engine understands qualified Dublin Core metadata and IEEE Learning Object Metadata. In preferred embodiments for other applications, persons skilled in the art will recognize which metadata schema and profiles of metadata schema should be natively supported and which should be stored in the configuration module.

Step 3: Taxonomies are identified. Requests issues by the host application may ask for classifications according to certain taxonomies. These must be identified. Taxonomies may be stored in schema using standards. For example, taxonomies of skills, knowledge, abilities and attitudes may be stored using IEEE 1484.20-2007 Standard for Reusable Competency Definitions. The analysis engine may be required to match content objects to such taxonomies. The analysis engine must first analyze the form of data that is needed by Step 4: Quality and comparison metrics are identified. The host application may request that existing metadata be analyzed for consistency with automatically generated metadata. In this case, the analysis engine stores this for the next step.

Step 5: Information aggregation heuristics are identified. In one embodiment, an information aggregation heuristic is provided as object code together with information about that code. The information identifies (by unique identifier) a set of information retrieval routines and the object code implements a rule for converting the output of those routines into the desired metadata and a rule for encoding that metadata in a format that can be transmitted back to the host application through the service layer. A typical heuristic relying on a single information retrieval algorithm might look as follows:

Metadata to be generated: Platform requirements
Information retrieval routines: MIME Type identifiers
Rule: Check MIME types against list retrieved from configuration module. If all MIME types are on list, map these to platform requirements, and return this list through the service layer via an RDF binding of Dublin Core metadata. Set the error code to NULL. If not, return FALSE and set error string to a list of unrecognized types.

Another example that illustrates how information from multiple sources may be combined:

Metadata to be generated: Semantic Density (IEEE 1484.12.20-2000) for a text passage.

Information retrieval routines: Routines that match content to a taxonomy of learning objectives using Latent Semantic Analysis (LSA), routines that measure the reading level (e.g. Flesch-Kincaid) of text, and routines that check for mathematical or symbolic content, and routines that generate content statistics.

Rule (partial): Check whether there is any mathematical content or non-textual content in the object. Assume not. Set the LSA threshold to 0.8. Count the number of learning objectives that meet or exceed this threshold. Multiply by two hundred and divide this by the number of words in the text. Determine the reading level divide this by 8. Add these together and encode the result according to the quoted standard.

A third example illustrates how the present invention can map contextual information to metadata:

Metadata to be generated: Copyright Statement, unformatted

Information retrieval routines: Routines that search for Creative Commons licenses, attached standardized rights expressions, and copyright statements. An additional routine is needed to transform rights expressions into copyright statements.

Rule (partial): If the user is the author, generate a copyright statement determined by the policy. Search for an existing copyright statement. If a Creative Commons license exists, retrieve the license and return it. If a copyright statement exists, return that. If a rights expression is attached, process that into a copyright statement and return the statement. If no copyright statement is found, check the role of the user. If the role is author, generate a copyright statement using a policy stored in the configuration module. If the role is not an author, generate a different copyright statement based on a default policy, e.g. one that assigns copyright and reserves all rights for the enterprise that is using the present invention.

The APIs used by information aggregation heuristics conform to the requirements of an information retrieval harness whose purpose is to invoke a plurality of information retrieval routines, each identified by a unique internal identifier, and to return the data from these routines.

Step 6: The analysis engine identifies which information retrieval routines must be used, which contextual information or existing metadata is required, and what metadata on sub-objects has already been generated and stored. For each object (or sub-object) to be analyzed, an information retrieval harness starts and collects data from a plurality of information retrieval routines. In a preferred embodiment these routines include Latent Semantic Analysis, MIME type analyzers, N-grams, Summarizers, Complexity Analyzers and routines that read and retrieve existing metadata embedded in files or associated with files by the operating system.

Step 7: Data is passed to the information retrieval heuristics through the information retrieval harness, to the service layer by the information retrieval heuristics and to the host application by the service layer.

A configuration module plays a key role in many embodiments of the present invention. In these embodiments, the configuration module is used to store information retrieval heuristics, taxonomies, corporate policies, metadata schema, and data (such as semantic spaces) used by the analysis engine and the information retrieval routines (FIG. 4). This method has technical and practical advantages over existing methods. Software companies that incorporate the present invention into their host applications can provide services based upon the configuration module, including services for generating and tuning semantic spaces used in Latent Semantic Analysis, services that define and update enterprise taxonomies, services that create new metadata elements and that define or re-define information aggregation heuristics for customers. This enables software companies to install, configure, run and maintain embodiments of the present invention with minimal effort and to sell configuration services to customers.

In a preferred embodiment, the configuration module has a User Interface (UI) that displays a list of available information retrieval routines, a metadata schema tool, and an authoring tool for creating information aggregation heuristics. The authoring tool enables these to be written in a well-known language such as Java, C# or Ruby and provides a method for compiling them. The UI to the configuration module enables new information retrieval routines to be added to the information retrieval harness and existing routines to be altered. In a preferred embodiment the configuration module incorporates an authentication and authorization system that requires administrative privileges to make changes.

In non-commercial educational settings, the configuration module can be used to place control of the behavior of the present invention in the hands of users, making it easier for educational institutions to customize metadata generation components. In one embodiment, the present invention is used by a Course Management System such as Moodle or Blackboard. Semantic spaces are generated for various disciplines (Math, English, Biological Sciences, etc.) and incorporated into information retrieval routines based on Latent Semantic Analysis. The configuration module provides institutions with ways to change the corpus used to generate these semantic spaces and re-generate and re-tune the information retrieval routines. The configuration module is also used to store copyright policies and develop or alter information aggregation heuristics for learning time, difficulty level, and generating metadata about authors derived from contextual information present in the Course Management System.

Any combination of information, data, knowledge base, database, courses, material, and program, e.g. on-line, real-time, mixed media, in-class, multi-media, and audio, are included here. Any methods of delivery and storage are included here. Any method of security, authentication, biometrics, PKI, key, license, DRM, usage, access, and entry are included here. Any combination of format, form of digital data, analog data, standards, delivery vehicle, and language are included here. Any variations of the above teaching are also intended to be covered by this patent application.

The invention claimed is:

1. A system for automatic generation of metadata for learning and knowledge objects, said system comprising:
a host application;
a service layer;
an analysis engine;
a configuration module;
and a data storage;
wherein said configuration module is connected to and communicates with said service layer and said analysis engine;

wherein said data storage is connected to said analysis engine and said host application;

wherein said service layer is connected to and communicates with said analysis engine and said host application;

wherein said service layer receives requests from and sends reply to said host application;

wherein said service layer sends requests to and receives reply from said analysis engine;

wherein said host application sends a first request for first metadata for an object along with information about said object to said service layer;

wherein said object comprises one or more sub-objects; wherein said host application sends a second request for classification of said object according to one or more taxonomies to said service layer;

wherein said service layer passes said first request, said second request, and said information to said analysis engine; and wherein said analysis engine processes said first request, said second request, said information and contextual information to generate said first metadata and returns said first metadata to said service layer, wherein said service layer passes said first metadata received from said analysis layer to said host application.

2. A system as recited in claim 1, wherein said analysis engine comprising:

a metadata generator;
an information aggregation heuristics unit;
an information retrieval harness; and
a database;

wherein said analysis engine identifies said object;
wherein said analysis engine identifies said first metadata;
wherein said analysis engine identifies said one or more taxonomies;
wherein said analysis engine identifies information aggregation heuristics;
wherein said analysis engine identifies one or more information retrieval routines that are used;
wherein said analysis engine identifies contextual information that is used;
wherein said analysis engine identifies third metadata for said one or more sub-objects that are previously stored in said database;
wherein said information retrieval harness collects data from a plurality of said one or more information retrieval routines;
wherein said information retrieval harness passes collected said data to said information aggregation heuristics unit;
wherein said information aggregation heuristics unit processes said data and sends the processed data to said metadata generator;
wherein said metadata generator generates said second metadata according to configured or stored taxonomies, metadata schema, organizational policies, and semantic spaces, and sends it to said service layer; and
wherein said configuration module stores said one or more information retrieval routines, said taxonomies, said organizational policies, said metadata schema, and said semantic spaces used by said analysis engine and said information retrieval routines.

3. A system as stated in claim 2, wherein said analysis engine comprising of an object aggregator and disaggregator;

wherein said object aggregator and disaggregator aggregates and disaggregates said object to said one or more sub-objects, respectively;

wherein said object aggregator and disaggregator stores said first metadata for said object and said one or more sub-objects in said database;

wherein said object aggregator and disaggregator retrieves previously analyzed and stored information of said one or more sub-objects;

wherein said object aggregator and disaggregator sends said previously analyzed and stored information to said information retrieval harness;

wherein said information retrieval harness passes said previously analyzed and stored information to said information aggregation heuristics unit;

wherein said information aggregation heuristics unit uses said previously analyzed and stored information and said data to compute said processed data.

4. A system as stated in claim 2, wherein said host application requests from said analysis engine that said first metadata be compared and analyzed for consistency with automatically generated said second metadata.

5. A system as stated in claim 4, wherein said analysis engine identifies the quality and comparison metrics for consistency analysis.

6. A system as stated in claim 2, wherein services are offered based on said configuration module, wherein said services generate and tune said semantic spaces, define and update said taxonomies, create new metadata elements, or define or re-define said information aggregation heuristics for customers.

7. A system as stated in claim 2, where said one or more information retrieval routines are substituted with new or improved information retrieval routines.

8. A system as stated in claim 2, wherein said system is integrated directly into end said host application using integrated services.

9. A system as stated in claim 2, wherein said system creates association among two or more said objects.

10. A system as stated in claim 2, wherein said system adds descriptive and contextual information to digital learning content, digital documents, or other objects used in learning and knowledge management.

11. A system as stated in claim 2, wherein said object is documents, Web page, assessments, knowledge objects, rights licenses, learning objects, competencies, learning interventions, or classifications systems used to organize content.

12. A system as stated in claim 2, wherein said host application is document authoring tool, Web content authoring tool, learning content management system, rights management system, knowledge management tool, email applications, or software that manages content development workflows.

13. A system as stated in claim 2, wherein said system caches data and recognizes the relationships among said objects and said one or more sub-objects.

14. A system as stated in claim 2, wherein said system requests are triggered by user actions, including importing or publishing content.

15. A system as stated in claim 2, wherein said system uses content aggregation de facto standards; wherein said standards comprise one or more of the following: MPEG-21 Part II, IMS Content Packaging, Darwin Information Typing Architecture, or Metadata Encoding and Transmission Standard.

16. A system as stated in claim 15, wherein said content aggregation de facto standards uses Extensible Markup Language XML, or the Open Knowledge Initiative Service Interface Definitions JSR170.

17. A system as stated in claim 2, wherein said service layer is a software service that provides application programmer interfaces or Web services that are described by Web Service Description Language and accessed through HTTP using the Simple Object Access Protocol.

18. A system as stated in claim 2, wherein said host application is a learning content authoring tool and said metadata in conformant to the 1484.12.3-2005 IEEE Standard for Learning Technology, Extensible Markup Language (XML) Schema Definition Language Binding for Learning Object Metadata.

19. A system as stated in claim 2, wherein said taxonomies include corporate structure or departments, taxonomies of skills, knowledge, abilities and tasks, and designations of confidentiality, classification, or usage rights.

20. A system as stated in claim 2, wherein the user of said host application selects one or more classifications from a drop down list corresponding to said one or more taxonomies; said analysis engine returns its opinion of the correct classification together with a correlation between the selected classification and the suggested classification, based on semantic analysis techniques including Latent Semantic Analysis, and wherein said host application relies on said analysis engine to suggest a classification, and either accepts that suggestion or enable the user to view and modify that suggestion.

* * * * *